United States Patent [19]

McAlister

[11] Patent Number: 5,724,911
[45] Date of Patent: Mar. 10, 1998

[54] BED FOR A HOUSEHOLD PET

[76] Inventor: John B. McAlister, 424 Camping Creek Ct., Chapin, S.C. 29036

[21] Appl. No.: 712,790

[22] Filed: Sep. 12, 1996

[51] Int. Cl.⁶ ........................................ A01K 1/035
[52] U.S. Cl. ............................................... 119/28.5
[58] Field of Search ........................ 119/28.5, 169, 119/526; 5/652

[56] References Cited

U.S. PATENT DOCUMENTS

| | | | |
|---|---|---|---|
| 1,569,710 | 1/1926 | Burt . | |
| 2,742,652 | 4/1956 | Mautz | 5/652 |
| 3,066,646 | 12/1962 | Bramley . | |
| 3,638,255 | 2/1972 | Sterrett | 5/636 |
| 3,900,648 | 8/1975 | Smith | 5/636 |
| 3,902,456 | 9/1975 | David | 119/28.5 |
| 4,008,688 | 2/1977 | Nicholas | 119/28.5 |
| 4,184,237 | 1/1980 | Blankenship | 5/655.9 |
| 4,649,861 | 3/1987 | Elkins et al. | 119/28.5 |
| 4,860,689 | 8/1989 | Stewart | 119/28.5 |
| 4,961,930 | 10/1990 | Perdelwitz, Jr. et al. | 119/28.5 X |
| 5,002,014 | 3/1991 | Albin | 119/28.5 |
| 5,136,981 | 8/1992 | Barreto, III et al. | 119/28.5 |
| 5,144,911 | 9/1992 | Moore et al. | 119/28.5 |
| 5,197,411 | 3/1993 | Schwarzenbart | 119/28.5 |
| 5,226,384 | 7/1993 | Jordan | 119/28.5 |
| 5,265,558 | 11/1993 | Schonrock | 119/28.5 |
| 5,363,804 | 11/1994 | McAlister | 119/28.5 |
| 5,515,811 | 5/1996 | McAlister | 119/28.5 |
| 5,588,393 | 12/1996 | Heibom | 119/28.5 |
| 5,603,284 | 2/1997 | Freedman | 119/28.5 |

FOREIGN PATENT DOCUMENTS

| | | |
|---|---|---|
| 0528660A2 | 2/1993 | European Pat. Off. . |
| PCT/AU84/ 00148 | 2/1986 | WIPO . |

*Primary Examiner*—Robert P. Swiatek
*Assistant Examiner*—Elizabeth Shaw
*Attorney, Agent, or Firm*—Michael A. Mann

[57] ABSTRACT

A cushion for a pet, preferably a cat, comprising a bed formed from a sheet comprising a plurality of layers of raw unwoven, uncovered polyester. Each layer comprises a solid first fiber and a second fiber that has a core and a sheath surrounding the core. The sheath has a lower melting temperature than the core. The sheet is then heated to the temperature, where the sheath of the second fiber melts and sticks to the adjacent fiber, whether a first or a second fiber, and is then cooled until the second fiber solidifies, attached to the adjacent fiber. The resulting material is a matted web of layered, electrostatic fibers that is subsequently cut into a right cylinder having a closed end of suitable size, such as large enough to accommodate a sleeping cat. The cylinder wall is then folded down on itself from its open end to form an annular upright wall having an inside layer and an outside layer, where the outside layer compresses the inside layer to form a more rigid wall.

18 Claims, 4 Drawing Sheets

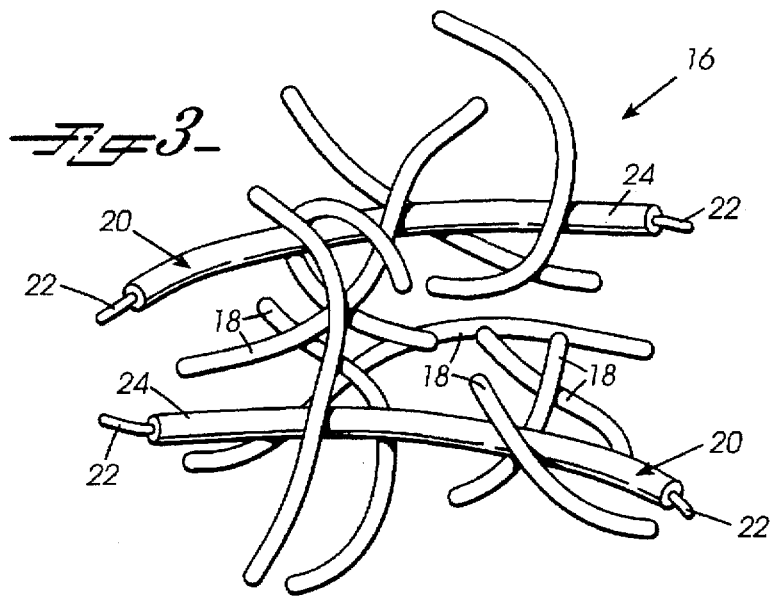
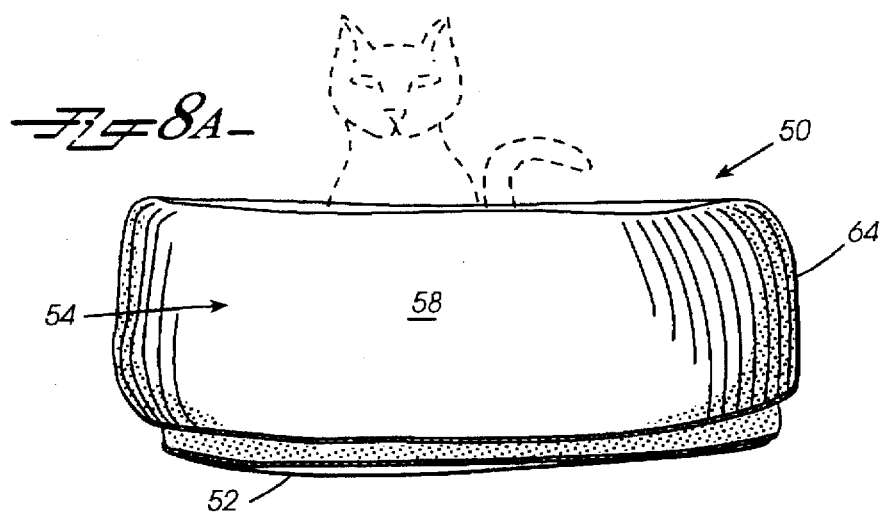
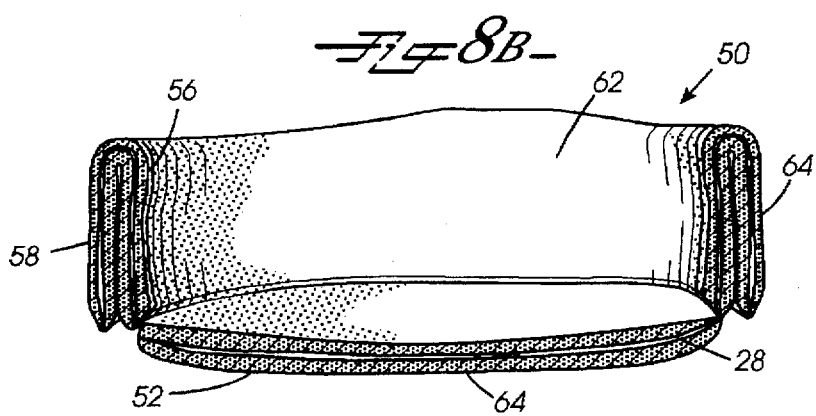

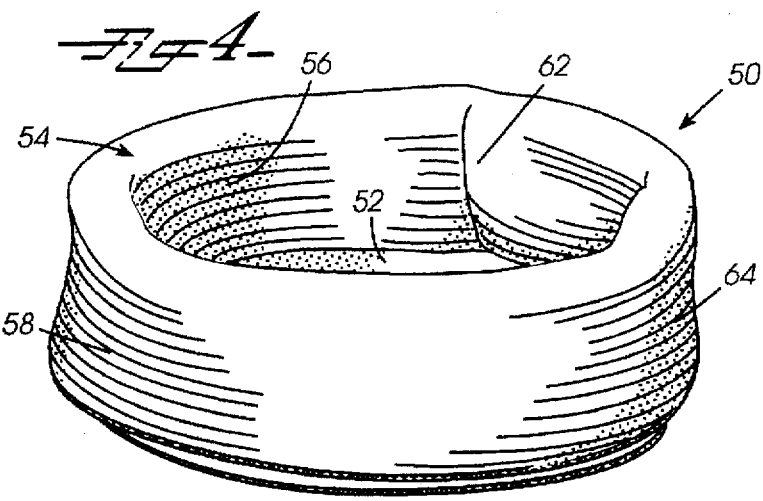
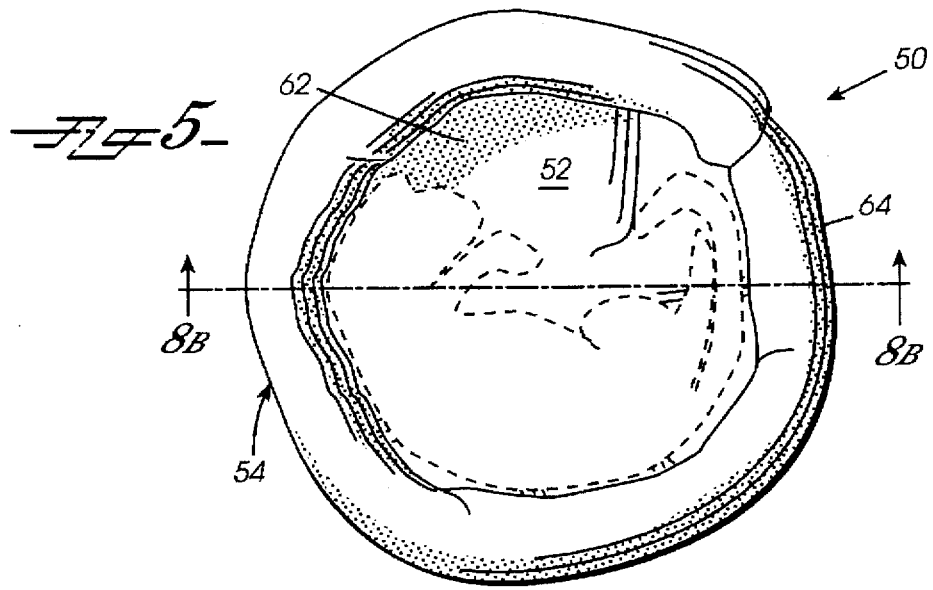
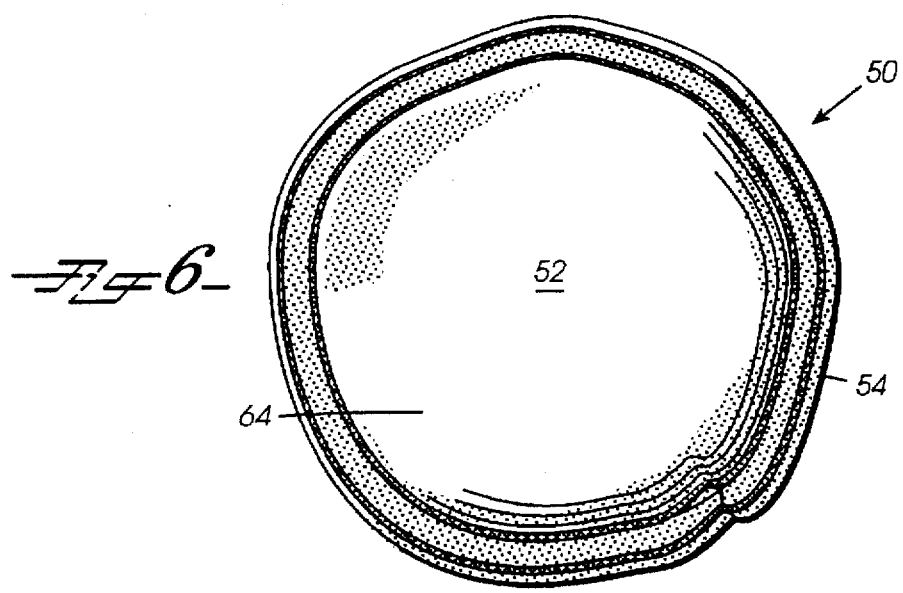

BED FOR A HOUSEHOLD PET

BACKGROUND OF THE INVENTION

1. Field of the Invention

This invention relates to a bed for a pet. More specifically, the invention relates to an uncovered fibrous bed for a cat.

2. Discussion of Background

People find comfort in having domestic pets, such as dogs and cats. Cats, in particular, are sometimes preferred as pets because many people believe they are easier to care for than dogs. Cats are, however, notoriously independent and curious. They have a tendency to go where they please and to nap on furniture or beds as they please. This habit of napping on beds and furniture can be a problem, especially if a cat has an odor, has fleas, sheds, or if an occupant of the household is allergic to cats.

Pet owners will often purchase cushions and beds for their pets in an attempt to provide a comfortable place for the animal to nap as an alternative to furniture and beds for humans. Typically, these cushions and beds are padded and covered in fabric. Sometimes these are accepted by animals and sometimes not.

A variety of pet beds, pads, or cushions are available for domestic animals. U.S. Pat. No. 3,902,456 granted to David features a cloth-covered cushion; U.S. Pat. No. 5,144,911 granted to Moore, et al. features a water repellent NYLON-covered cushion; U.S. Pat. No. 5,002,014 granted to Albin features woven polyester strands coated with polyvinyl chloride; and U.S. Pat. No. 3,066,646 granted to Bramley features polyvinyl chloride reinforced with a web of polyethylene terephthalate.

Other beds are available that feature multiple layers. U.S. Pat. No. 4,649,861 granted to Elkins, et al. describe a three-layered pet mat. U.S. Pat. No. 1,569,710 granted to Burt describes a one-piece pet mat made of an absorbent material, preferably chenille, which is a velvety material having standing wool or silk "fingers".

Pet cushions are also available with insect repellent coatings. U.S. Pat. No. 4,008,688 granted to Nicholas and U.S. Pat. No. 1,569,710 granted to Burt disclose impregnating or saturating a pet cushion with insecticides. U.S. Pat. No. 3,902,456 granted to David alternatively uses an adhesive in conjunction with an intermediate cushion layer to trap insects.

In addition, in U.S. Pat. No. 5,515,811 and U.S. Pat. No. 5,363,804, issued to the present inventor, a cushion satisfying many of the prior art problems is disclosed. However, despite the availability of cushions and beds for pets, there remains a need for a bed that a cat or other domestic animal will prefer to beds and furniture for humans.

SUMMARY OF THE INVENTION

According to its major aspects and broadly stated, the present invention is a bed for domestic animals, particularly for cats. The bed comprises padding made of a number of layers of fibers, preferably of raw, unwoven polyester fibers. Each layer comprises a plurality of first polyester fibers that are solid and a plurality of second polyester fibers, each having a core and a sheath. A plurality of layers of first and second fibers is formed by randomly strewing both kinds onto a surface. After the layers of fibers are formed into a pad of suitable thickness, the pad is heated to a temperature at which the sheath of second fibers melts against an adjacent fiber, which could be a first or a second fiber, and is then cooled until the second fiber solidifies. When it does, it sticks to the adjacent fiber. The thermally-induced attachment of the fibers gives the pad a webbed or matted finish and good resilience. The fiber layers are cut into a pad dimensioned to be large enough to accommodate a sleeping pet. Then the edge of the pad is bound by sewing or heat treatment to preserve its geometric integrity. To form the bed from the pad, the pad is fashioned into a cylinder with a closed end and then the cylinder is turned down against itself to add stiffness to the walls of the resulting bed. The bed is then placed on the floor (or on furniture as a protective cover) where the cat owner wants the cat to nap.

An important feature of the present invention is the combination of the texture and resilience of the bed. The feel of the spaced fibers of the bed and its resilience attracts cats and seems to fascinate them. In this regard, the lack of a cover over the raw polyester is important in the acceptance of the cushion to the cat. The attraction provided by the uncovered bed for cats thus gives the cat owner a measure of control over the cat, because the cat owner can use the bed to decide where he or she wants the cat to nap.

Another important feature of the present invention is the material of which the bed is made, namely, raw, unwoven polyester, which is easily cleaned, stain-resistant, and maintains its resilience. Moreover, this material has two properties that make it ideal for the present use as a bed for a pet: it is naturally electrostatic (cationic), and it is a thermal insulator. Because it is electrostatic, cat hairs and dander tend to cling to this material rather than being spread over the house. Its insulating characteristic keeps the pet warm yet permits air flow, and is therefore more comfortable to the pet than fabric-covered cushions.

Yet another important feature of the present invention is that the layers are resilient and flexible. In a preferred embodiment of the present invention, the layers of fiber can be sewn or otherwise easily formed into a right cylinder having a closed end. After this cylinder is formed, the open end of the cylinder is folded down around itself, toward the closed end of the cylinder. Once formed and folded, the layer of fibers forms a bed for the pet, which has a floor and an annular-shaped upright wall, and because the wall is formed from two layers, one constricted about the outside of the other, the wall is more resilient and thus will better retain its shape.

Other features and advantages will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3 is a detailed view of first and second fibers according to a preferred embodiment of the present invention;

FIG. 4 is a perspective view of the cushion having a folded cylindrical shape, according to a preferred embodiment of the present invention;

FIG. 5 is a top view of the cushion having a folded cylindrical shape with a cat shown in broken lines, according to a preferred embodiment of the present invention;

FIG. 6 is a bottom view of the cushion having a folded cylindrical shape, according to a preferred embodiment of the present invention;

FIG. 8A is a side view of the cushion having a folded cylindrical shape with a cat shown in broken lines, according to a preferred embodiment of the present invention; and FIG. 8B is a cross-sectional view taken along line 8B—8B in FIG. 5 of a cushion having an unfolded cylindrical shape, according to a preferred embodiment of the present invention.

DETAILED DESCRIPTION OF PREFERRED EMBODIMENTS

The present invention, in one preferred embodiment, is a pet cushion, preferably for cats, that has a texture and resilience attractive to cats. In another embodiment, the present invention is a bed for a pet. The present invention gives the pet owner a tool to effectively define the cat's napping place, and in so doing, make other areas less desirable for napping. In some respects, the present invention is also a novelty for cat owners who enjoy watching cats respond to their environment and furnishing maximum comfort for their pet.

Figure 1:
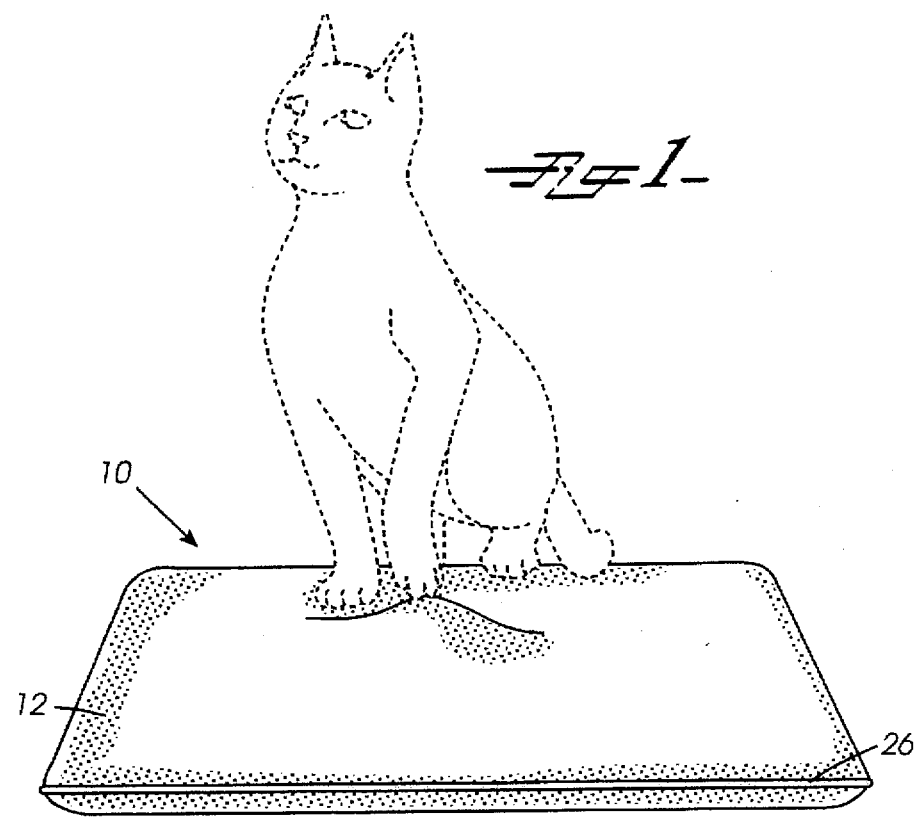
FIG. 1 is a perspective drawing of a cushion according to a preferred embodiment of the present invention.
Figure 2:
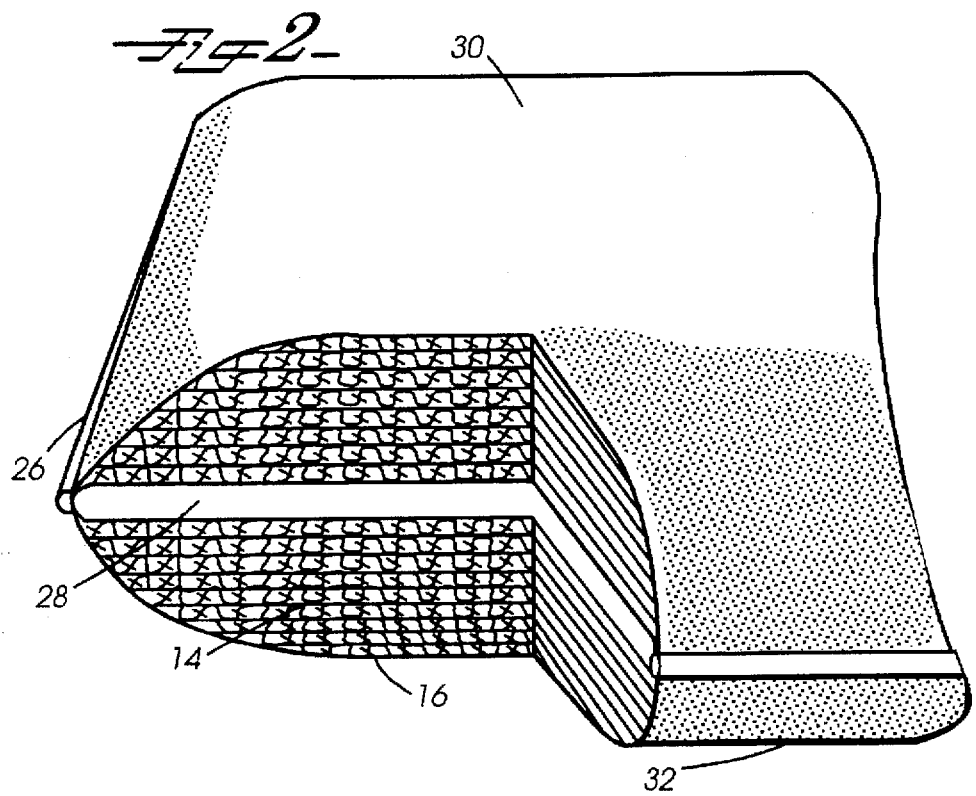
FIG. 2 is a cross-sectional view of the cushion of FIG. 1 showing an inner layer, according to a preferred embodiment of the present invention.

Referring now to FIGS. 1, 2, and 3, the present invention is illustrated in a preferred embodiment, namely, a cushion generally indicated by reference numeral 10, preferably for cats, but suitable for use by other domestic animals. Cushion 10 in its simplest embodiment comprises a pad 12 having a multiplicity of layers 14 of fibers 16, preferably fibers of raw, unwoven polyester. Each layer 14 comprises a plurality of first fibers 18 and a plurality of second fibers 20. Preferably, first fibers 18 comprise approximately 80% by weight of pad 12 and are preferably solid, 15 Denier polyester fibers, such as those manufactured by Hearst Celanese. Second fibers 20 comprise preferably 20% of pad 12. Each second fiber 20 has a core 22, which is preferably a 2 Denier polyester fiber, and a sheath 24, preferably a 2 Denier bi-component copolymer having a low melting temperature, surrounding core 22.

Pad 12 is formed by randomly placing a mixture of first fibers and second fibers on a surface to form a first layer 14 of a plurality of layers 14. Another layer 14 is placed over the first layer 14, and so on. In the preferred embodiment, there are between twenty-five and forty layers required to form a pad 12 of approximately two inches in thickness. Pad 12 is then heated to a temperature where sheaths 24 of second fibers 20 begin to melt against an adjacent fiber of either type: first fiber 18 or second fiber 20. Pad 12 is then cooled. When cooled, sheath 24 of the second fiber 20 solidifies, sticking against the adjacent fiber. Heating followed by cooling gives pad 12 a structure that is highly porous and mat-like, rather than woven, and a resilience.

Pad 12 has a top 30 and a bottom 32. Top 30 is left uncovered so that a pet engages the pad 12 directly. Bottom 32 can be covered or not as desired. A coveting on bottom 32 can serve to protect a surface or be simply decorative. Top 30 remains uncovered so that the pet can lie in direct engagement with top 30 of pad 12. This structure, in the form of a cushion about two inches thick, is highly attractive to cats, as it is without coverings, other layers or any further processing except to bind the edges of pad 12.

Cats are known for needing to scratch, and various items such as scratching posts are provided commercially for cat owners to direct this need. Without wishing to be bound by theory, the present pad provides a surface that enables cats to scratch without harming furniture or their claws or toes. Furthermore, the resilience of the pad seems to respond to touch in a life-like manner; specifically, it resists movement and returns to its original shape when pressed. This responsiveness is apparently attractive to cats.

Pad 12 should be made large enough to accommodate a large housecat in a sleeping position, preferably in the form of a square with dimensions of at least twenty inches on a side and a thickness in the range of one and one-half to two inches. Top 30 of pad 12 should not be covered with a fabric (although bottom 32 may or may not be covered as desired). A fabric is a barrier to fibers 16 that comprise layers 14, which are an important aspect of the texture of cushion 10. This texture, in combination with the resilience of pad 12, attracts and holds the attention of cats.

The edge 26 of pad 12 is preferably finished or bound by heat treatment or by sewing so that cushion 10 maintains its geometric integrity, that is, fibers 16 are not readily pulled loose so that cushion 10 gradually looses its shape.

Pad 12 may also be made with an inner layer 28 (FIG. 2) that can be impregnated with one or more of a variety of compounds, such as a non-toxic, flea retardant chemical. Alternatively, inner layer 28 can be impregnated with a different pesticide, a deodorizer, a fragrance, or even catnip.

In use, cushion 10 is preferably placed within an area of the home where the owner wants the cat to nap, such as a corner of a kitchen or porch. Alternatively cushion 10 can be secured to an upright object such as a scratching post. Periodically, cushion 10 can be laundered or simply replaced with a new one.

The texture and resilience of cushion 10 appears to attract a cat. A cat will approach cushion 10 out of curiosity and test its surface with a paw. The cat will then climb onto cushion 10 and repeatedly pat its surface as if to test the resilience. The cat will then lie down on the surface and find it more comfortable, because it insulates without preventing air flow through it. Its electrostatic property causes it to retain cat hairs and dander. Because of the curiosity, almost to the point of fascination, exhibited by cats for cushion 10 and its comfort, cushion 10 gives to cat owners a measure of control over their pets and where they nap. The owner can then determine where the cat will nap by placing cushion 10 at that location. The cat's and the owner's interests become aligned.

Referring now to FIGS. 4, 5, 6, 7A, 7B, 8A, and 8B, cushion 10 is shown in one of its more complex forms as a bed 50. Bed 50 is formed similar to pad 12 having a multiplicity of layers 14 of fibers 16, preferably fibers of raw unwoven polyester. Layers 14 combine to form a sheet 60 of layers 14, which in the preferred embodiment has between twenty-five and forty layers, so that sheet 60 is approximately two inches thick.

Figure 7A:
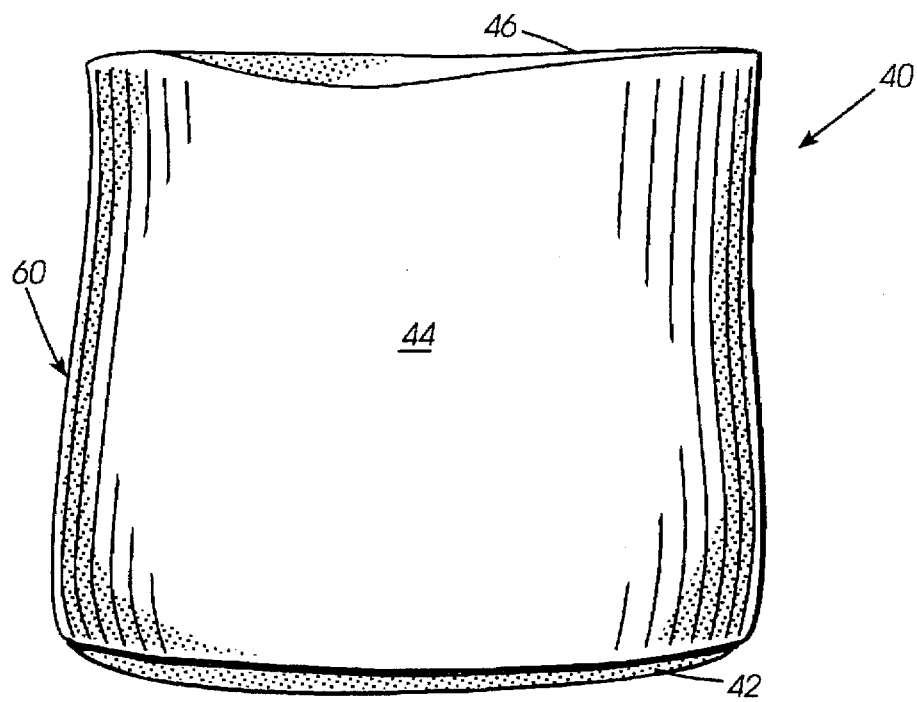
FIG. 7A is a side view of the cushion having an unfolded cylindrical shape, according to a preferred embodiment of the present invention.
Figure 7B:
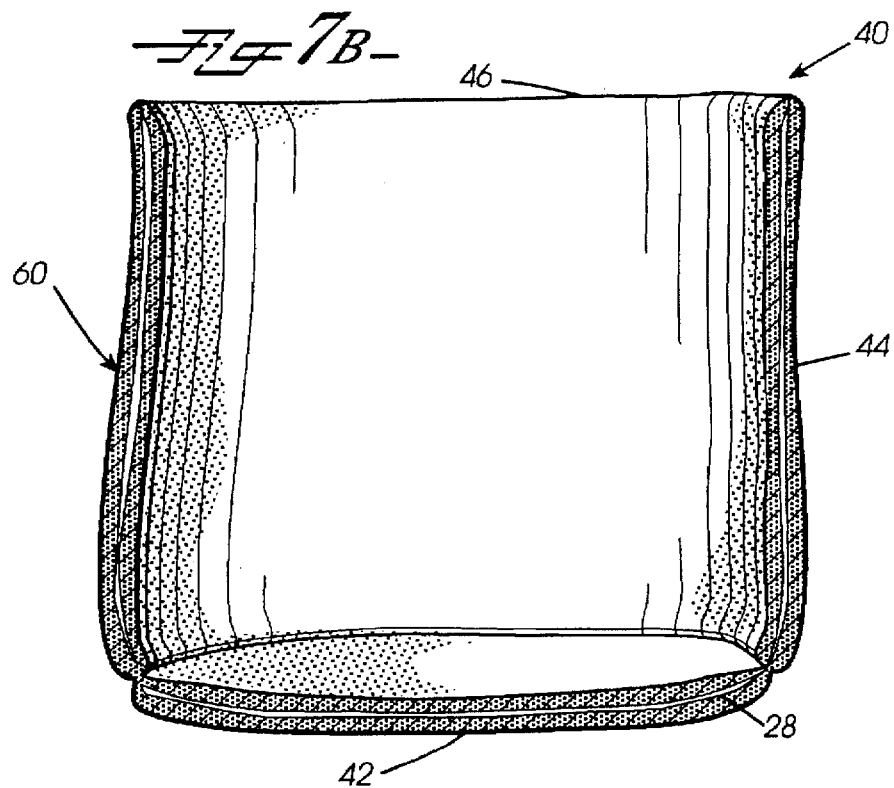
FIG. 7B is a cross-sectional view of a cushion as shown in FIG. 7A having an unfolded cylindrical shape, according to a preferred embodiment of the present invention.

Sheet 60 is constructed into a right cylinder 40 having a closed end 42 and an open end 46, as shown in FIGS. 7A and 7B, wherein closed end 42 serves as a floor 52 for bed 50. In this form, the cylinder wall 44 of right cylinder 40 is flexible and moderately resilient. In other words, if one side of cylinder wall 44 is pushed inward, it will return to its original shape; however, cylinder wall 44 is not sufficiently rigid as would be preferred in bed 50. Consequently, it is necessary to fold cylinder wall 44 of right cylinder 40 down over itself as shown in FIGS. 8A and 8B.

In practice and beginning at open end 46 of cylinder 40, cylinder wall 44 is folded down over itself to define an inside layer 56 and an outside layer 58, and thus annular upright wall 54 surrounds floor 52. Inside layer 56 is now compressed by outside layer 58, while the thickness of annular upright wall 54 is doubled as compared to wall 44 of cylinder 40; therefore forming a relatively rigid annular upright wall 54 surrounding floor 52 of bed 50. Consequently, by folding cylinder wall 44 to form annular upright wall 54, the rigidity of annular upright wall 54 is increased without the use of an internal structural support.

Bed 50 also has an inside surface 62 and an outside surface 64, which are similar to top 30 and bottom 32 of pad 12, respectively. In other inside surface 62 of bed 50 is designed as a pet-engaging surface, while outside surface 64 may be covered by a protective material or a decorative material.

It will also be recognized that any of the additional above steps that are performed to pad 12 may also be performed to bed 50, including, but not limited to, impregnating an inner layer 28 (shown in FIGS. 7B and 8B) of bed 50 with one or more of a variety of compounds, such as a non-toxic, flea retardant chemical. In addition, bed 50 should be dimensioned for a sleeping cat, wherein floor 52 has a diameter of at least fifteen inches.

It will be apparent to those skilled in the art from a careful reading of the detailed description of the foregoing preferred embodiments that many modifications and substitutions can be made in the foregoing without departing from the spirit and scope of the invention. The present invention, moreover, is not limited to the specific example of uses given but, rather, is defined by the appended claims.

What is claimed is:

1. A process of making a cushion for a cat, comprising the steps of:
   strewing raw unwoven polyester in a series of layers having a thickness;
   heating said series of layers to a first temperature;
   cooling said series of layers;
   cutting said series of layers into sheets;
   forming said sheets into a right cylinder having a closed end, an open end, and a cylinder wall; and
   folding said cylinder wall from said open end to said closed end to form an annular upright wall having a thickness twice that of said cylinder wall, said annular upright wall extending from said closed end of said cylinder.

2. The process as recited in claim 1, wherein said folding step forms a bed having a pet engaging inside surface and an outside surface.

3. The process as recited in claim 1, wherein said folding step forms an annular upright wall with an inside layer and an outside layer, wherein said outside layer compresses said inside layer.

4. The process as recited in claim 1, further comprising the steps of:
   impregnating a material with a non-toxic, flea retardant chemical; and
   placing said material among said layers so that it does not directly contact said cat when said cat lies on said cushion.

5. The process as recited in claim 1, wherein said folding step forms a bed having a pet-engaging inside surface and an outside surface, and wherein said folding step forms an annular upright wall with an inside layer and an outside layer.

6. The process as recited in claim 1, wherein said folding step forms a bed having a pet-engaging inside surface, and wherein said folding step forms a wall with an inside layer and an outside layer, wherein said outer layer compresses said inner layer.

7. The process as recited in claim 1, wherein said folding step forms an annular upright wall with an inside layer and an outside layer, wherein said outside layer compresses said inside layer, and said process, further comprises the step of impregnating a material with a non-toxic, flea retardant chemical.

8. The process as recited in claim 1, wherein said folding step forms an annular upright wall with an inside layer and an outside layer, wherein said outside layer compresses said inside layer, and said method further comprises the step of impregnating said cushion with a non-toxic, flea-retardant chemical so that said chemical does not directly contact said cat when said cat lies on said cushion.

9. The process as recited in claim 1, wherein said folding step forms a bed having a pet-engaging inside surface and an outside surface, and wherein said method further comprises the step of impregnating said cushion with a non-toxic, flea-retardant chemical.

10. The process as recited in claim 1, wherein said folding step forms a bed having a pet-engaging inside surface and an outside surface, and wherein said method further comprises the step of impregnating said cushion with a non-toxic, flea-retardant chemical so that said chemical does not directly contact said cat when said cat lies on said cushion.

11. An article for use as a cushion for a pet, said article comprising:
   a bed constructed from a sheet made of matted, resilient fibers formed in layers, said bed having an inside surface and an outside surface, said inside surface being a pet engaging surface whereon said pet can lie in direct engagement with said inside surface of said bed, said bed having a floor with an annular upright wall having an inside layer and an outside layer wherein said outside layer compresses said inside layer to form said annular upright wall, said resilient fibers including a first fiber and a second fiber, said second fiber having a core and a sheath, said sheath comprising a low melt polyester.

12. The article as recited in claim 11, wherein said fibers are naturally electrostatic.

13. The article as recited in claim 11, wherein said fibers are thermally insulating.

14. The article as recited in claim 11, wherein said fibers are made of raw, unwoven polyester.

15. The article as recited in claim 11, wherein said bed is dimensioned for a sleeping cat, said floor being at least approximately fifteen inches in diameter.

16. The article as recited in claim 11, wherein said fibers are naturally electrostatic and thermally insulating.

17. The article as recited in claim 11, wherein said fibers are made of raw, unwoven polyester, and wherein said bed is dimensioned for a sleeping cat.

18. The article as recited in claim 11, wherein said fibers are naturally electrostatic, and wherein said bed is dimensioned for a sleeping cat.

* * * * *